(12) United States Patent
Goto (10) Patent No.: US 7,246,575 B2
(45) Date of Patent: Jul. 24, 2007

(54) THRUST FORK

(75) Inventor: Tsuneo Goto, Tokyo (JP)

(73) Assignee: Porta Industry Co., Ltd., Tokyo (JP)

( * ) Notice: Subject to any disclaimer, the term of this patent is extended or adjusted under 35 U.S.C. 154(b) by 54 days.

(21) Appl. No.: 11/170,102

(22) Filed: Jun. 30, 2005

(65) Prior Publication Data

US 2007/0000451 A1    Jan. 4, 2007

(51) Int. Cl.
*A01K 15/04* (2006.01)

(52) U.S. Cl. .................... 119/802; 119/770; 70/16

(58) Field of Classification Search ............... 119/802, 119/801, 769, 770, 791, 811, 816; 168/45; 294/86.4, 19.1; 70/16; 128/869
See application file for complete search history.

(56) References Cited

U.S. PATENT DOCUMENTS

| | | | | |
|---|---|---|---|---|
| 216,482 A * | 6/1879 | Wilson et al. | ............... | 119/802 |
| 421,814 A * | 2/1890 | Bunce | .................... | 600/243 |
| 824,402 A * | 6/1906 | Betz et al. | .................... | 119/802 |
| 1,759,054 A * | 5/1930 | Laub | ........................... | 119/802 |
| 2,485,703 A * | 10/1949 | Christoffer | .................. | 119/802 |
| 3,841,685 A * | 10/1974 | Kolodziej | .................. | 294/19.1 |
| 3,872,834 A * | 3/1975 | Fuhrman | .................... | 119/801 |
| 4,426,079 A * | 1/1984 | Mason | ........................ | 119/801 |
| 5,066,013 A * | 11/1991 | Kubota | ........................ | 119/801 |
| 5,088,449 A * | 2/1992 | Lamb et al. | ................. | 119/802 |
| 5,116,260 A * | 5/1992 | Upchurch | ............... | 114/221 R |
| 5,326,101 A * | 7/1994 | Fay | ........................... | 463/47.4 |
| 5,400,623 A * | 3/1995 | Bota | ............................ | 70/16 |
| 5,778,826 A * | 7/1998 | Dillon et al. | ............... | 119/717 |
| 6,039,370 A * | 3/2000 | Dooley et al. | ............... | 294/1.5 |
| 6,067,942 A * | 5/2000 | Fernandez | .................. | 119/802 |
| 6,098,572 A * | 8/2000 | Cook | ......................... | 119/802 |
| 7,029,397 B1 * | 4/2006 | Barwick | ................... | 463/47.4 |

FOREIGN PATENT DOCUMENTS

| | | | |
|---|---|---|---|
| JP | 07-103695 | | 4/1995 |
| JP | 3041513 | | 7/1997 |
| JP | 2001-289593 | * | 10/2001 |
| JP | 3083227 | | 10/2001 |
| JP | 3089372 | | 8/2002 |
| JP | 3102890 | | 4/2004 |
| JP | 2004-264014 | * | 9/2004 |

* cited by examiner

*Primary Examiner*—Yvonne R. Abbott
(74) *Attorney, Agent, or Firm*—Bacon & Thomas, PLLC

(57) ABSTRACT

To provide a thrust fork to arrest a resisting criminal without danger of being stabbed by an edge tool, a thrust fork main body (2) attached to an end of a handle portion (1) is provided with a forked rod (21), movable opening and closing rods (23), which have base end portions respectively pivoted to leading ends of the forked rod and freely swivel only inside the forked rod without outward movement, a returning element (24) to return the opening and closing rods (23) by a spring to an original position, and a constraining rope (26), both ends of which are engaged with leading ends of the opening and closing rods (23) respectively to form a ring 44 having a suitable size inside the forked rod, whereby the end of the forked rod is opened and closed via swiveling of the opening and closing rods.

9 Claims, 10 Drawing Sheets

THRUST FORK

TECHNICAL FIELD

The present invention relates to a thrust fork used at a time when mainly a police man or the like seizes a criminal, a thug or others to be seized.

BACKGROUND ART

Figure 12:
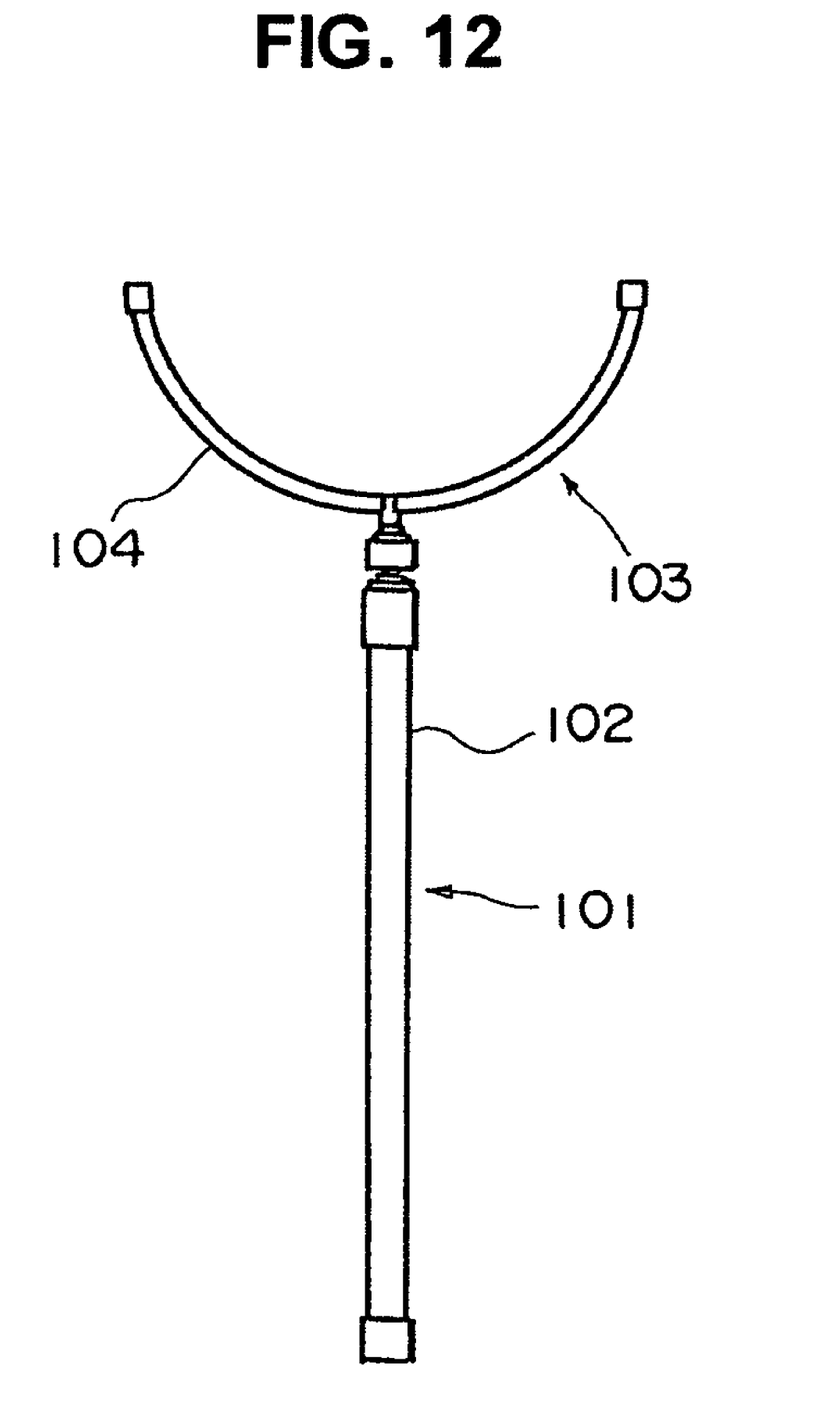
FIG. 12 is a front view showing a conventional thrust fork.

As a conventional thrust fork, as shown in FIG. 12 for example, there has been generally known a structure in which a thrust fork main body 103 constituted by a forked rod 104 branched in a semicircular shape, a U shape, a V shape or the like (the semicircular shape in the drawing) is attached to a leading end of a handle portion 101 constituted by a telescopic rod 102 or the like (refer to Japanese Unexamined Patent. Publication No. 7-103695, Japanese Utility Model No. 3089372, Japanese Utility Model No. 3041513, Japanese Utility Model No. 3083227, for example). The thrust fork is structured such that the police man or the like holds the handle portion 101 by hands and presses a body of a criminal or the like by the forked rod 104 so as to seize it, so that the criminal or the like can be constrained.

However, the conventional thrust fork has the following problems. (1) Since the conventional thrust fork is structured such as to press the body of the criminal or the like so as to seize it, the conventional thrust fork can not be effectively used in a place where a wall or a boarding of a building, or a barrier material such as a fence or the like does not exist. (2) Since a motion of the criminal or the like cannot be held at a position which is apart from the barrier material, there is a risk that that the criminal or the like escapes at a time of arresting. (3) Since the structure is made such that the forked rod presses only the body of the human body, the motion of the body can be held, however, arms and feet can be freely moved. Accordingly, a lot of trouble is caused in the next action, that is, an arresting operation such as handcuffing or the like. (4) Since arms can be moved freely, for example, at a time of seizing the criminal or the like who holds an edge tool such as knife or the like, there is a danger that the arresting person is stabbed by the edge tool at a time of arresting by handcuffing or the like.

Accordingly, the inventor of the present application has developed a thrust fork (a prior art) having the following structure, in order to solve the problems mentioned above. The thrust fork in accordance with the prior art is a thrust fork having a thrust fork main body attached to a leading end of a handle portion, wherein the thrust fork main body comprises a forked rod, movable opening and closing rods, which are connected to leading ends of both branches of the forked rod and arranged to be opposed each other so as to rise and fall in the directions of moving close to and apart from each other at a predetermined angular range, a lock means for locking and releasing freely a motion of both the opening and closing rods at a time when both the opening and closing rods rise and fall at the predetermined angle, and a rope for constraint provided such that one end is engaged with the leading end portion of the one opening and closing rod and the other end is engaged with the leading end portion of the other opening and closing rod, and has a suitable length, and wherein the leading ends of the forked rod are opened and closed by rising and falling both the opening and closing rods, and a ring is formed by the rope at a time when both the opening and closing rods rise and fall (refer to Japanese Unexamined Patent Publication No. 2001-289593).

In accordance with the prior art mentioned above, since force is applied to the leading ends of the opening and closing rods via the rope, when pressing the thrust fork to a target region (for example, an arm of the criminal or the like) in the state that both the opening and closing rods are opened, both the opening and closing rods fall, and are locked in the state that the portion between both the leading ends of the forked rod is closed by both the rods. Further, when both the opening and closing rods fall, an endless ring is formed by the rope. Accordingly, in the case of pressing the leading end of the thrust fork main body to the arm holding the edge tool, for example, at a time of arresting the criminal having the edge tool or the like, both the opening and closing rods fall, and are locked in the state that the arm is caught in the ring formed by the rope. Accordingly, since the arm holding the edge tool is constrained by the ring of the rope, and the motion of the arm is controlled, it is possible to avoid the danger of being stabbed by the edge tool and it is possible to easily arrest the criminal. Further, in the case of pressing the leading ends of the thrust fork main body to an ankle region of the criminal or the like, the opening and closing rods are locked by the same operation as mentioned above in the state that the ankle region is caught in the ring of the rope so as to be constrained. Accordingly, since the criminal or the like can be easily tripped sideways by operating the handle portion such as pulling the handle portion, it is possible to easily arrest the criminal or the like, similarly to the foregoing.

However, the following room to be improved still exists in the prior art. The prior art requires a work for resetting the movable opening and closing rods to the original position every time after use. Further, since the structure, for example, of the lock means or the like is complex, the manufacturing requires a lot of man-hours, and a production cost is increased.

DISCLOSURE OF THE INVENTION

Problem to be Solved by the Invention

The present invention is made by taking the matters mentioned above into consideration, and an object of the present invention is to provide a thrust fork in which a structure can be made simple by making good use of the advantage of the prior art and adding an improvement, the work for resetting the opening and closing rods in the prior art can be omitted, and a criminal or the like can be constrained without having the danger of being stabbed by the edge tool even in the case of arresting the criminal holding the edge tool, so as to easily arrest the criminal.

Means for Solving the Problem

In order to achieve the object mentioned above, in accordance with one aspect (a first aspect) of the present invention, there is provided a thrust fork comprising:

a handle portion; and a thrust fork main body provided in a leading end of the handle portion, wherein the thrust fork main body is provided with a forked rod having a pair of branch rods branched in a forked shape, a pair of movable opening and closing rods which have base end portions respectively attached to leading end portions of both the branch rods via pivots and is arranged to be opposed each other and to freely swivel around the pivots in the directions of rising and falling with respect to the branch rods, a returning means for energizing both the opening and closing rods so as to swivel in the direction of rising with respect to the branch rods, and a stopper means for regulating motion of both the opening and closing rods swiveling in the outward direction of the forked rod, and wherein the leading ends of the forked rod are opened and closed by both the opening and closing rods, by swiveling of both the opening and closing rods.

In accordance with the first invention, the leading ends of the forked rod are closed by both the opening and closing rods. Further, the motion (swivel) of both the opening and closing rods in the outward direction of the forked rod is regulated by the stopper means, and both the opening and closing rods swivel around the pivot portion in the direction of moving apart from each other at a time of receiving pressing force to the forked rod in the inward direction, and are returned to the original position on the basis of the operation of the returning means by canceling of the pressing force. Accordingly, when pressing the leading ends of the thrust fork main body to the target region (for example, a leg, a thigh or the like of the criminal or the like), both the opening and closing rods swivel in the direction of moving apart from each other against the operation of the returning means so as to open the leading ends of the forked rods (the portion between the leading ends of both the opening and closing rods) and introduce the target body (the leg, the thigh or the like) into the inner side of the forked rod. After the target body having passed the portion between the leading ends of both the opening and closing rods, both the opening and closing rods are returned to the original position on the basis of the operation of the returning means so as to close the leading ends of the forked rod by both the opening and closing rods. Accordingly, the target body becomes in the state of entering into the forked rod.

When the leading ends of the thrust fork main body are pressed to the thigh or the like of the criminal or the like at a time of arresting the criminal or the like, both the opening and closing rods swivel in the direction of moving apart from each other so as to open the leading ends of the forked rod and introduce the thigh or the like into the inner side of the forked rod. Further, after the thigh or the like has passed the portion between the leading ends of both the opening and closing rods, both the opening and closing rods are returned on the basis of the operation of the returning means, and the leading ends of the forked rod are closed, so that, the thigh or the like becomes in the state of entering into the forked rod. Accordingly, since the thigh or the like of the criminal or the like is constrained, and the motion thereof is regulated, it is possible to arrest the criminal or the like. Further, since the criminal or the like can be tripped sideways by operating the handle portion such as pulling the handle portion in the state of the thigh or the like being caught in the forked rod as mentioned above, it is possible to easily arrest the criminal or the like.

In accordance with the other aspect (a second aspect) of the present invention, there is provided a thrust fork comprising:

a handle portion; and a thrust fork main body provided in a leading end of the handle portion, wherein the thrust fork main body is provided with a forked rod having a pair of branch rods branched in a forked shape, a pair of movable opening and closing rods which have base end portions respectively attached to leading end portions of both the branch rods via pivots and is arranged to be opposed each other and to freely swivel around the pivots in the directions of rising and falling with respect to the branch rods, a returning means for energizing both the opening and closing rods so as to swivel in the direction of rising with respect to the branch rods, a stopper means for regulating motion of both the opening and closing rods swiveling in the outward direction from the forked rod, and a constraining rope such as a wire rope or the like having a desired length and provided in the manner that one end is engaged with a leading end portion of the one opening and closing rod and the other end is engaged with a leading end portion of the other opening and closing rod, and wherein the leading ends of the forked rod are opened and closed by both the opening and closing rods, by swiveling of both the opening and closing rods.

In accordance with the second invention, the leading ends of the forked rod are closed by both the opening and closing rods, and an endless-shaped ring is formed by the rope in an inner side of the forked rod (between both the branch rods). Further, the motion (swivel) of both the opening and closing rods in the outward direction of the forked rod is regulated by the stopper means, and both the opening and closing rods swivel around the pivot portion in the direction of moving apart from each other at a time of receiving pressing force to the forked rod in an inward direction, and are returned to the original position on the basis of the operation of the returning means by canceling of the pressing force. Accordingly, when pressing the leading ends of the thrust fork main body to the target region (for example, an arm, an ankle or the like of the criminal or the like), both the opening and closing rods swivel in the direction of moving apart from each other against the operation of the returning means so as to open the leading ends of the forked rod (the portion between the leading ends of both the opening and closing rods) and introduce the target body (the arm, the ankle or the like) into the inner side of the forked rod. After the target body having passed the portion between the leading ends of both the opening and closing rods, both the opening and closing rods are returned to the original position on the basis of the operation of the returning means so as to close the leading ends of the forked rod by both the opening and closing rods. Accordingly, the target body is in a state of entering into the ring formed by the rope within the forked rod.

When the leading ends of the thrust fork main body are pressed to the arm holding the edge tool at a time of arresting the criminal or the like, for example, holding the edge tool, both the opening and closing rods swivel in the direction of moving apart from each other so as to open the leading ends of the forked rod and introduce the arm into the inner side of the forked rod. Further, after the arm has passed the portion between the leading ends of both the opening and closing rods, both the opening and closing rods are returned on the basis of the operation of the returning means, and the leading ends of the forked rod are closed, so that the arm becomes in the state of entering into the ring of the rope. Accordingly, since the arm holding the edge tool is constrained, and the motion thereof is regulated, it is possible to avoid the danger of being stabbed by the edge tool so as to easily arrest the criminal person or the like. Further, in the case that an ankle region of the criminal or the like is pressed by the leading ends of the thrust fork main body, the ankle region is constrained in the state of the angle region being caught in the ring of the rope in accordance with the same operation as mentioned above, and the motion is regulated. Accordingly, since the criminal or the like can be easily tripped sideways by operating the handle portion such as pulling the handle portion or the like, it is possible to easily arrest the criminal person or the like, similarly to the foregoing.

In the present invention, the structure of the returning means is not particularly limited as far as the returning means is provided with a function of returning both the opening and closing rods to the original position when pressing force applied to both the opening and closing rods has been released. For example, the returning means can be constituted by a tensile coil spring, or a tensile elastic body made of tensile rubber or the like. Further, the returning means can be constituted by a leaf spring pressing the opening and closing rods in the direction of rising with respect to the branch rod.

In the present invention, the structure of the stopper means is not limited as far as the stopper means is provided with a function of regulating the motion that both the opening and closing rods swivel in the outward direction of the forked rod. For example, the stopper means can employ a structure including a stopper plate which is fixed to the leading end side of the branch rod, and is brought into contact with a predetermined portion of the opening and closing rod when the opening and closing rod swivels to a predetermined position in the returning direction. Further, in the present invention, the handle portion can by constituted by a multistage telescopic rod.

In accordance with the present invention, the following effects can be obtained. (1) It is possible to simplify the structure so as to reduce a production cost in comparison with the prior art. (2) It is possible to omit the work for resetting both the opening and closing rods. (3) It is possible to constrain the criminal or the like so as to easily arrest. (4) Particularly, in accordance with the second aspect, it is possible to avoid the danger of being stabbed by the edge tool even in the case of arresting the criminal or the like holding the edge tool, and arrest the criminal or the like.

BRIEF DESCRIPTION OF THE DRAWINGS

FIGS. 2A and 2B are views showing a portion of a thrust fork main body of the thrust fork in an enlarged manner, in which

FIGS. 9A and 9B are views showing a main portion of another embodiment of the thrust fork in accordance with the present invention, in which

FIGS. 11A and 11B are views showing a portion of a thrust fork main body of the thrust fork in FIG. 10 in an enlarged manner, in which

BEST MODE FOR CARRYING OUT THE INVENTION

A description will be given of embodiments of modes for carrying the present invention.

In FIGS. 1 to 7, the thrust fork in accordance with the embodiment (an embodiment 1) is constituted by a handle portion 1, and a thrust fork main body 2 attached to a leading end portion of the handle portion 1.

The handle portion 1 is formed in suitable diameter and length optionally. The handle portion 1 in accordance with the embodiment 1 is constituted by a multistage type telescopic rod 11 by fitting an optional number of tubes 11a, 11b and 11c made of an aluminum metal, a plastic or another raw material. The illustrated telescopic rod 11 is structured such as to be expanded and contracted in three stages by using three tubes 11a, 11b and 11c, however, the number of the tubes 11a, 11b and 11c can be optionally increased and reduced.

The tubes 11a, 11b and 11c have a click button 12 and a button engagement hole (not shown) in a predetermined portion, and is structured such that the button 12 is engaged with the engagement hole at a time of the maximum expansion of the telescopic rod 11 to be locked to the position in a manner of being freely engaged and disengaged. Further, an attaching portion 13 is formed in the tube 11a in the leading end of the rod 11, and the attaching portion 13 is attached to a predetermined portion of a forked rod 21 of the thrust fork main body 2 by fixing in accordance with a welding or the like as mentioned below. A bottom cover tube body 14 is attached to a rear end of the tube 11c having the largest diameter in the rod 11. In this case, the handle portion 1 can be structured by one rod in such a manner that the handle portion 1 is not expanded and contracted. Further, the handle portion 1 and the forked rod 21 of the thrust fork main body 2 can be integrally formed.

The thrust fork main body 2 is provided with the forked rod 21 having a pair of branch rods 22 and 22 branched in a U shape, a V shape or the other fork shape (a U shape close to a semicircular shape in the drawing) a pair of movable opening and closing rods 23 and 23 provided to be opposed each other in leading end portions of both the branch rods 22 so as to freely swivel in a predetermined direction, a returning means 24 swiveling both the opening and closing rods 23 in a predetermined direction so as to return, a stopper means 25 for regulating a motion (a swivel) of both the opening and closing rods 23 in the predetermined direction, and a rope 26 for constraint provided in such a manner that one end is engaged with the leading end portion of the one opening and closing rod 23 and the other end is engaged with the leading end portion of the other opening and closing rod 23.

The forked rod 21 is structured by an aluminum metal, a plastic or the other raw materials having suitable thickness and length. In the embodiment 1, the forked rod 21 is structured by a square bar material made of the aluminum metal or the like. The attaching portion 13 of the handle portion 1 is fixed to a center portion in a rear end of the forked rod 21 by welding or the other means. Accordingly, the thrust fork main body 2 is provided by both the branch rods 22 being fixed to the leading end of the handle portion 1 in the direction in parallel to the handle portion 1.

Both the opening and closing rods 23 are structured by the aluminum metal, the plastic or the other raw materials having suitable thickness and length. Both the opening and closing rods 23 in the embodiment 1 are structured by a square bar material made of the aluminum metal or the like. Further, leading ends 23a of both the opening and closing rods 23 are chamfered.

Both the opening and closing rods 23 are respectively attached by base end portions thereof (portions which are somewhat close to the leading end side from the base ends 23b) being axially supported to bearing members mentioned below, which are provided in the leading end portions of both the branch rods 22, via shafts 27, and are provided so as to be opposed each other and to freely swivel around the pivot portion (the shaft 27) in the directions of rising and falling with respect to the branch rods 22. Further, the structure is made such that the leading end of the forked rod 21 is opened and closed by both the opening and closing rods 23 by swiveling of both the opening and closing rods 23. In other words, the leading end of the forked rod 21 is closed when both the opening and closing rods 23 rise so as to be in the state that the leading ends 23a of both the rods 23 are close to each other (when axes of both the opening and closing rods 23 are positioned on approximately the same line), and both the opening and closing rods 23 swivel in the direction of falling with respect to the branch rods 22 from this state, whereby both the opening and closing rods 23 move apart from each other. Accordingly, the leading end of the forked rod 21 is opened.

Both the opening and closing rods 23 is regulated by the stopper means 25 in the motion that both the rods 23 swivel in the outward direction of the forked rod 21 from the position at which the leading end of the forked rod 21 is closed, that is, the attitude that the axes of both the opening and closing rods 23 are positioned on approximately the same line. Accordingly, both the opening and closing rods 23 are structured such that the axes can freely swivel only in the inward direction of the forked rod 21 from the position at which the axes are on approximately the same line (freely rise and fall with respect to the branch rods).

In the embodiment 1, there are provided a bearing member 28 axially supporting the opening and closing rod 23, and an attaching member 29 attaching fixedly the member 28 to the leading end of the branch rod 22. The bearing member 28 has a pair of bearing plates 30 and 30 having a suitable magnitude and provided so as to face to each other in parallel with a gap corresponding to the thickness of the branch rod 22, and a stopper plate 31 provided so as to be connected to upper ends in leading end sides of both the plates 30 at right angles to them, as in most detail shown in FIG. 5. Both the bearing plates 30 have axial holes 32 and 32 provided at positions near the upper ends in the rear portion side of the stopper plates 31 so as to face to each other in both plates 30, and plural sets of (two sets in the drawing) screw insertion holes 33 and 33 provided at positions in a rear portion side of the axial holes 32 so as to face to each other in both the plates 30 with suitable gaps in the vertical direction.

Further, the attaching member 29 has a pair of attaching plates 34 and 34 provided so as to face to each other with a gap for engaging with outer surfaces of both the bearing plates 30 and having suitable width and length, and a connection plate 35 provided by being connected to rear ends of both the plates 34 at right angles to them. Both the attaching plates 34 have screw insertion holes 36 and 36 provided at positions in the leading end portion side of the plate 34 and in correspondence to the screw insertion holes 33 and 33 so as to face to each other in both the plates 34.

Both the branch rods 22 have screw insertion holes 37 and 37 provided at positions in the leading end portion side of the rods 22 and in correspondence to the screw insertion holes 33 and 33 so as to pass through the rods 22. Further, both the opening and closing rods 23 have axial holes 38 provided at positions in the base end portions of the rods 23 so as to pass through the rods 23.

Further, both the bearing plates 30 of both the bearing members 28 are engaged with the leading end portions of the branch rods 22 in the state that the stopper plates 31 are directed to the inner portion side of the forked rod 21, and both the attaching members 29 are engaged with the outer surfaces of both the bearing plates 30 in the state that the connection plates 35 are directed to the outer portion side of the forked rod 21. Further, screw rods 39 are inserted through respective screw insertion holes 36, 33 and 37 of the attaching members 29, the bearing members 28 and the branch rods 22 in this state, and are fixed by fastening nuts 40. Accordingly, both the bearing members 28 are provided fixedly to the leading end portions of both the branch rods 22.

Further, both the opening and closing rods 23 are directed so that the axial holes 38 are aligned with the axial holes 32 of the bearing members 28, inner surfaces (lower portion side surfaces in FIG. 3) of the base ends 23b of the rods 23 are brought into contact with the leading end surface of the branch rods 22, outer surfaces (upper portion side surfaces in FIG. 3) of the rods 23 are brought into contact with inner surfaces of the stopper plates 31, and then the base end portions of both the opening and closing rods 23 are inserted to the portion between both the bearing plates 30. Further, both the opening and closing rods 23 are attached to the bearing members 28 by the shafts 27 being inserted through the axial holes 32 and 38 of the bearing members 28 and the opening and closing rod 23 in this state, and fastened by nut members 41 in such a manner that the opening and closing rods 23 become rotatable. Accordingly, both the opening and closing rods 23 are structured such as to be pivoted in the base end portions by the shafts 27, be regulated in the motion of swiveling in the outward direction of the forked rod 21 by the stopper means 25, that is, the stopper plates 31 and the leading end surfaces of the branch rods 22, and be rotatable only in the inward direction of the forked rods 21 (freely rise and fall with respect to the branch rods).

The stopper means 25 in accordance with the embodiment 1 are structured by the stopper plates 31 of the bearing members 28 and the leading end surfaces of the branch rods 22, as mentioned above.

The returning means 24 are structured such as to swivel both the opening and closing rods 23 in the direction of rising with respect to the branch rods 22 so as to return. The returning means 24 in accordance with the embodiment 1 are constituted by tensile coil springs 24a, as inmost detail shown in FIG. 3. Further, spring force is applied in such a manner that one end of the spring 24a is fastened to the base end portion of the opening and closing rod 23 by a screw 42 and the other end fastened to an outer surface at a suitable position of the leading end portion of the branch rod 22 by a screw 43, thereby the base end surface of the opening and closing rod 23 being pulled to the branch rod 22 side. Accordingly, the structure is made such that, when pressing force in the inward direction of the forked rods 21 is applied to both the opening and closing rods 23, both the rods 23 swivel in the direction of moving apart from each other against the operation of the spring 24a and return to the original position on the basis of the operation of the spring 24a by releasing of the pressing force.

Figure 7:
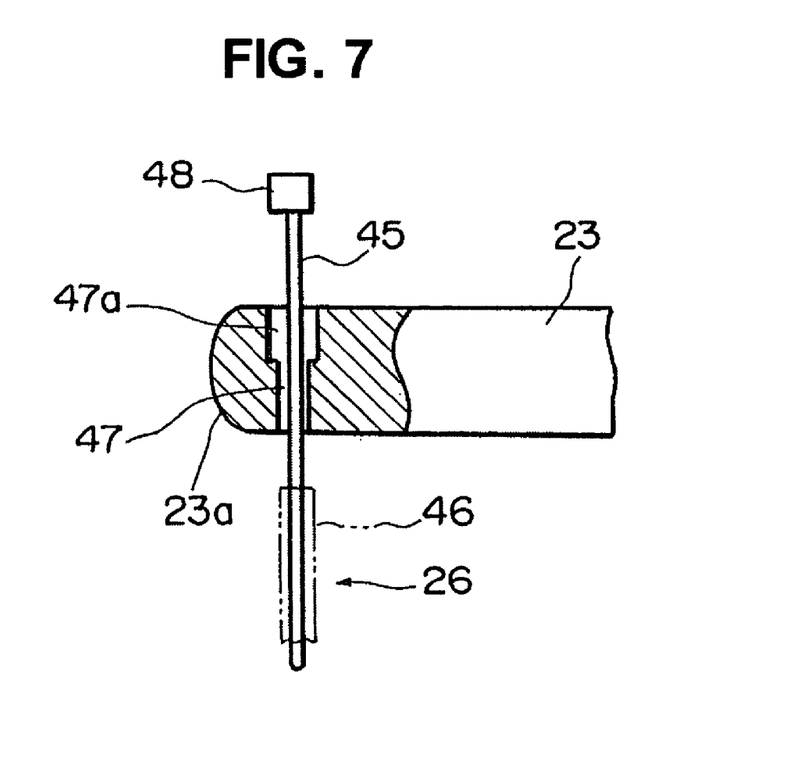
FIG. 7 is an explanatory view for explaining an engaging state of the opening and closing rod and the rope.

The constraining rope 26 is formed in a length by which a ring 44 having a suitable magnitude is formed in the inner portion of the forked rods 21, and is provided such that one end of the rope 26 is engaged with the leading end portion of the one opening and closing rod 23, and the other end is engaged with the leading end portion of the other opening and closing rod 23. The rope 26 in accordance with the embodiment 1 is constituted by a wire rope 45 having a suitable length, and a coating tube 46 made of a flexible synthetic resin or the like and fitted to the rope 45, as in detail shown in FIG. 6. Further, the structure is made such that both ends of the wire rope 45 are engaged with both the rods 23 by inserting both the end portions of the wire rope 45 through holes 47 (an outer portions of the holes 47 being formed into large-diameter holes 47a as shown in FIG. 7) provided in the leading end portions of both the rods 23 so as to extend in the direction orthogonal to the axial hole 38, arranging locking members 48 such as nuts or the like in both ends of the wire rope 45, and engaging the locking members 48 with an edge portions of the large-diameter holes 47a of the holes 47.

In accordance with the structure mentioned above, in the state that both the opening and closing rods 23 rise with respect to the branch rod 22, that is, in the state that the leading ends of the forked rod 21 are closed by both the opening and closing rods 23, an endless ring 44 is formed in the inner portion of the forked rod 21 by the rope 26. A target region 49 (an arm, an ankle region or the like) of the criminal or the like is caught in the ring 44 so as to be constrained. In this case, the coating pipe 46 is provided for protecting the arm, the angle region or the like of the criminal or the like at a time of the criminal or the like being constrained.

Figure 1:
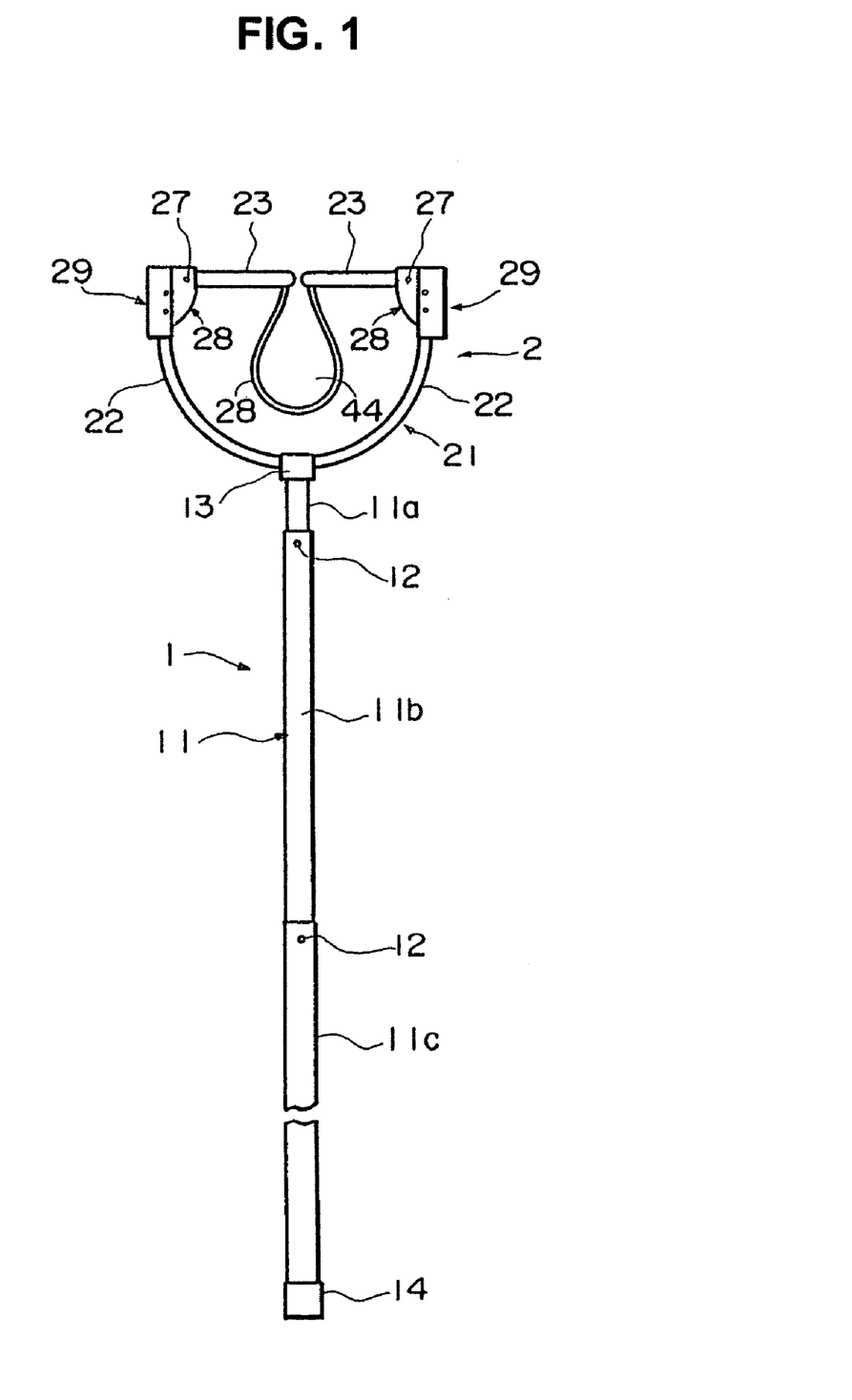
FIG. 1 is a front view showing an outline of an entire structure of an embodiment of a thrust fork in accordance with the present invention.
Figure 2A:
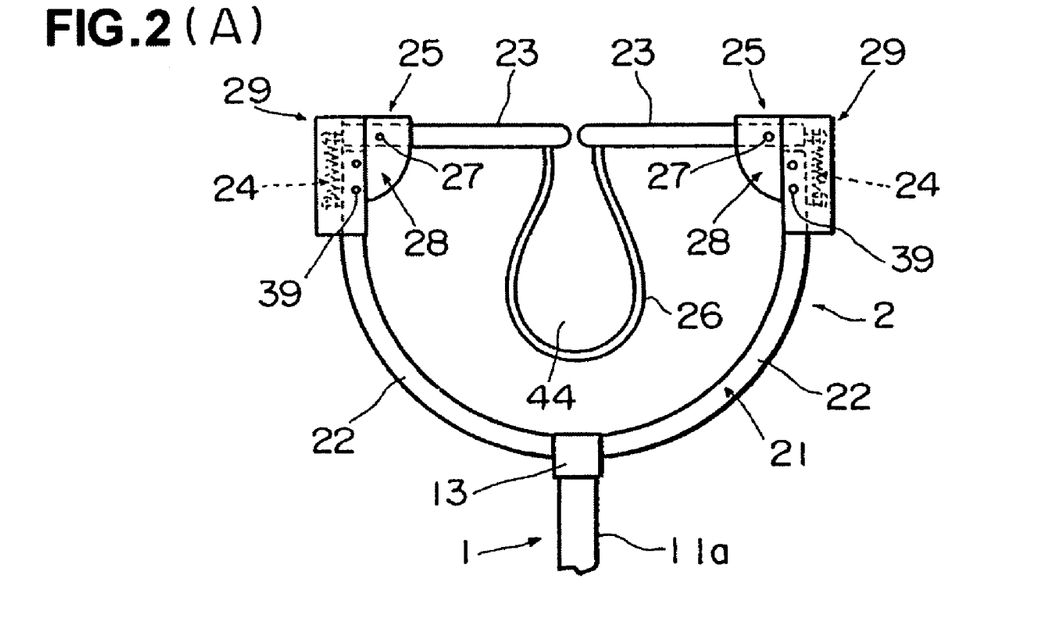
FIG. 2A is a front view showing the state that both movable opening and closing rods are closed.
Figure 2B:
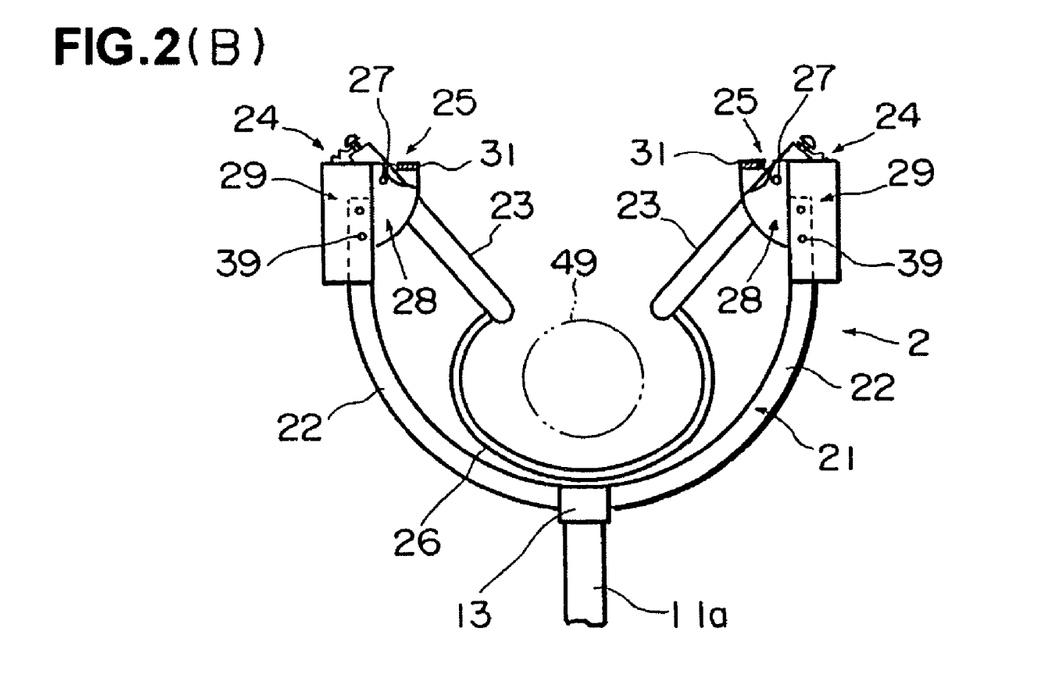
FIG. 2B is a front view showing the state that both the opening and closing rods are open.
Figure 3:
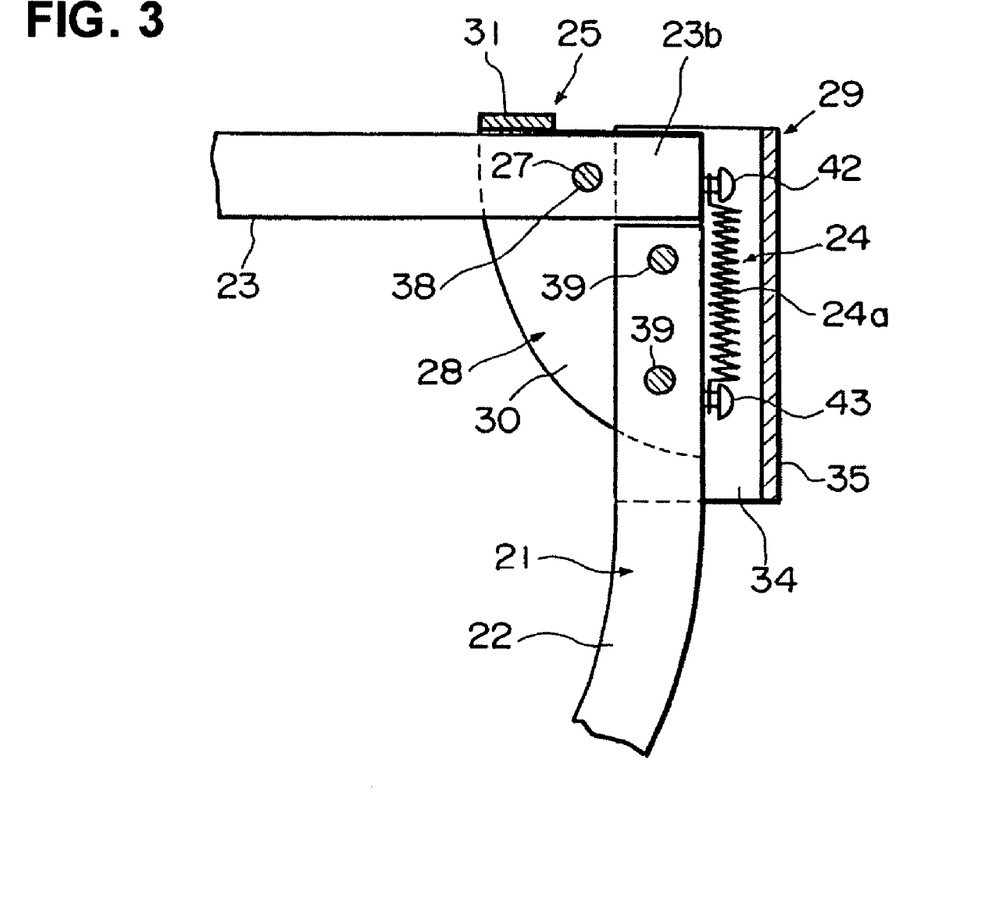
FIG. 3 is a vertical sectional view showing a part of a leading end portion of the thrust fork main body in an enlarged manner.
Figure 4:
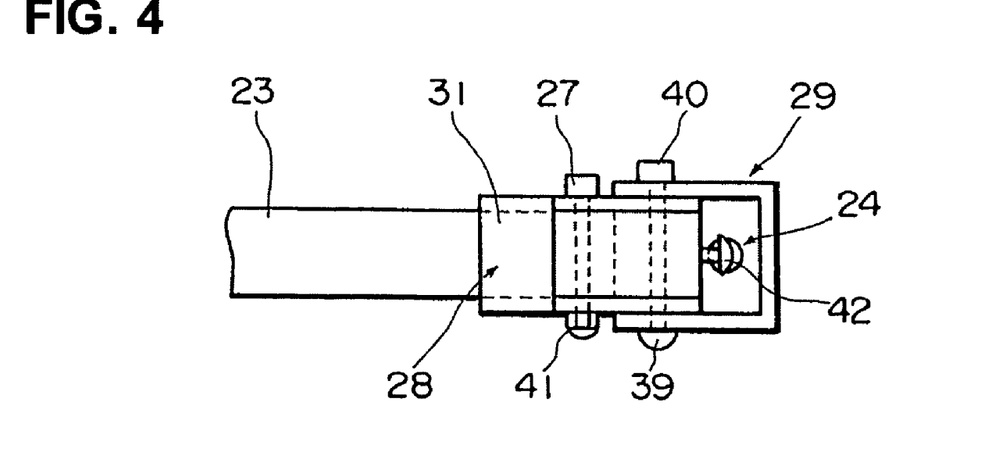
FIG. 4 is a plan view showing a part of the leading end portion of the thrust fork main body in an enlarged manner.
Figure 5:
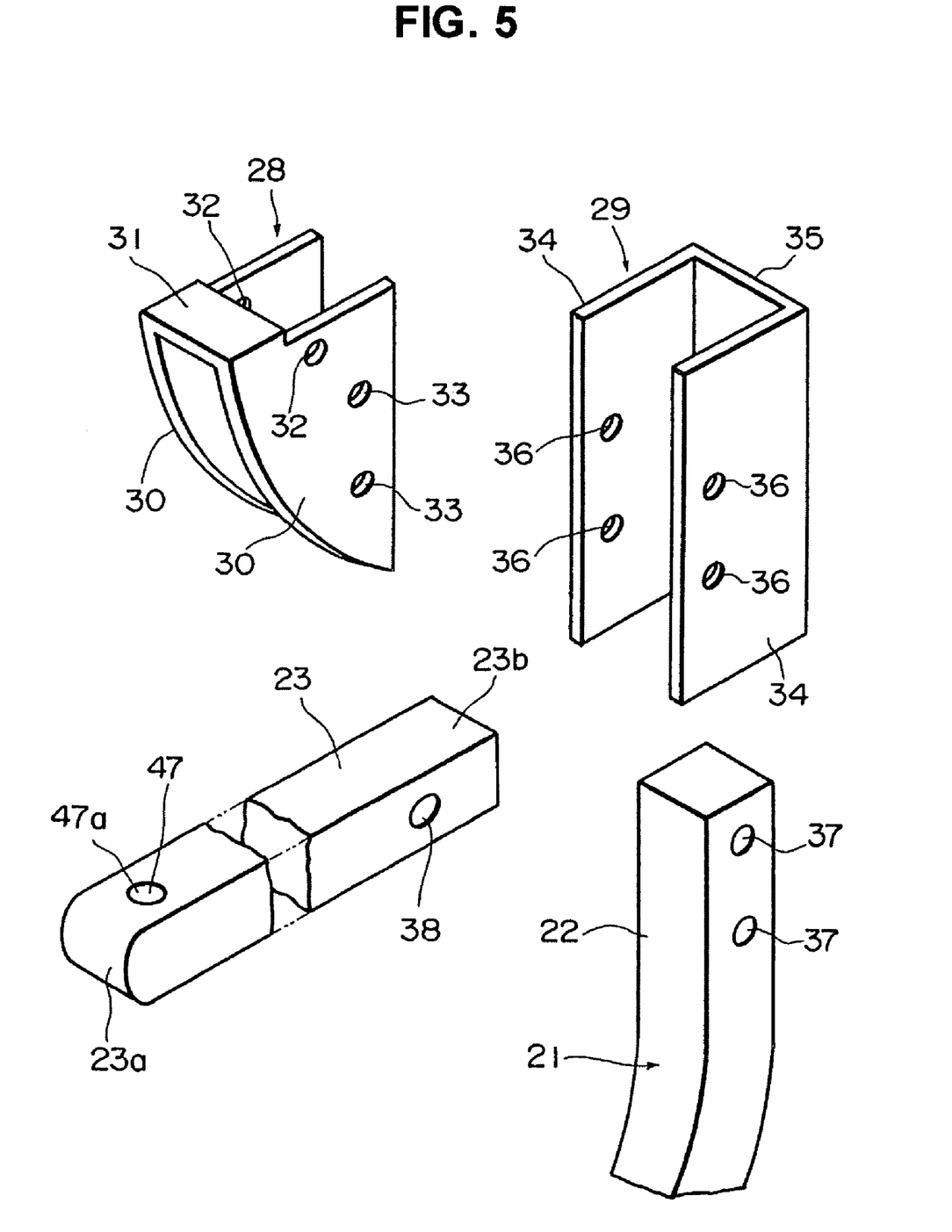
FIG. 5 is an explanatory view showing a part of the leading end portion of the thrust fork main body in an exploded manner.
Figure 6:
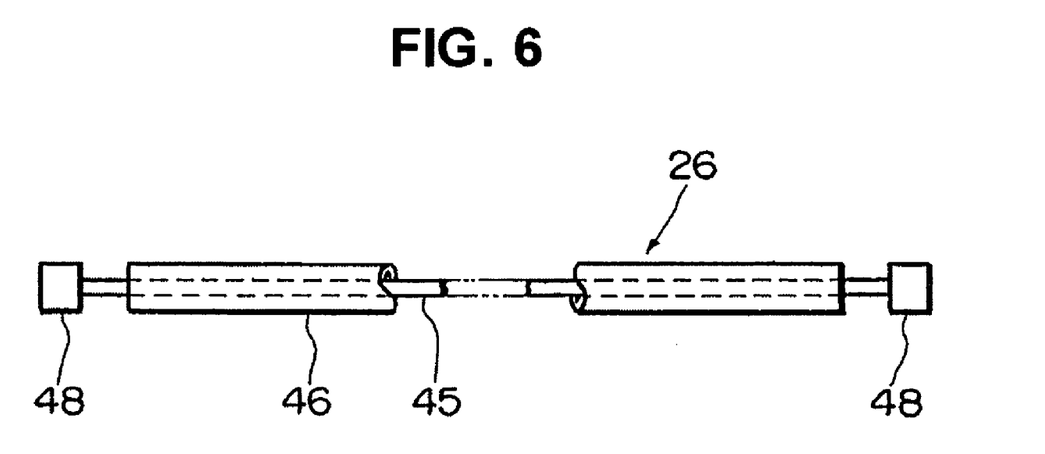
FIG. 6 is a front view showing a part of a constraining rope of the thrust fork main body.

The thrust fork in accordance with the embodiment 1 is structured as mentioned above. Next, a description will be given of an example of a using method, an operation and the like. For example, when arresting the criminal or the like holding an edge tool, both the opening and closing rods 23 swivel in the direction of moving apart from each other so as to open the leading ends of the forked rod 21 and introduce the arm 49 into the inner portion of the forked rod 21, as shown in FIG. 2B, by pressing the leading end of the thrust fork main body 2 to the arm 49 holding the edge tool to hold it between both the branch rods 22. Further, since both the opening and closing rods 23 are returned on the basis of the spring operation of the returning means 24 and the leading ends of the forked rod 21 are closed when the arm 49 passes through the portion between the leading ends of both the opening and closing rods 23, the arm 49 becomes in the state of being caught in the ring 44 of the rope 26. Accordingly, since the arm 49 holding the edge tool is constrained by the ring 44 of the rope 26, and the motion thereof is regulated, it is possible to avoid the danger of being stabbed by the edge tool so as to easily arrest the criminal or the like. Further, when pressing the leading end of the thrust fork main body 2 to the ankle region of the criminal or the like in the same manner as mentioned above, the angle region is constrained in the state that the ankle region is caught in the ring 44 of the rope 26 on the basis of the same operation as mentioned above, and the motion thereof is regulated. Accordingly, since the criminal or the like can be easily tripped sideways by operating the handle portion 1 such as pulling the handle 1, it is possible to easily arrest the criminal or the like in the same manner as mentioned above.

Further, since the stopper means 25 in accordance with the embodiment 1 are constituted by the stopper plates 31 of the bearing members 28, and the leading end surfaces of the branch rods 22, it is possible to securely regulate the motion (the swivel) of both the opening and closing rods 23 in the outward direction. Further, it is possible to structure the stopper means strong.

In this case, the embodiment 1 discloses the example in which the bearing member 28 and the attaching member 29 are separately structured, however, it is possible to employ a structure in which both the elements 28 and 29 are integrally formed.

Figure 8:
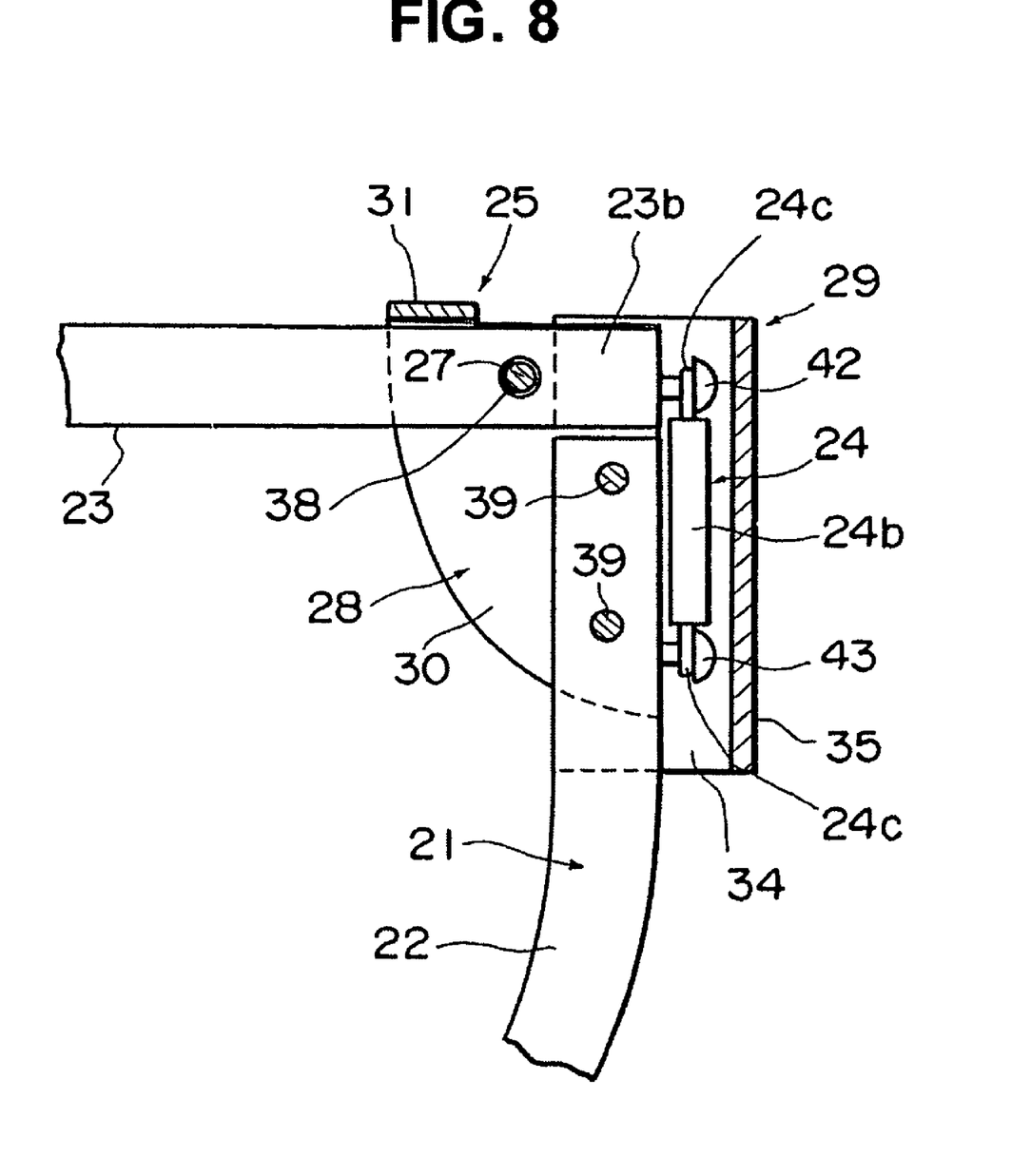
FIG. 8 is a vertical sectional view showing a main portion of another embodiment of the thrust fork in accordance with the present invention.

FIG. 8 is a vertical cross sectional view showing a main portion of another embodiment (an embodiment 2) of the thrust fork in accordance with the present invention. In this thrust fork, the same reference numerals are attached to the same members as those which are already described in the embodiment 1, and an description thereof will be omitted. The embodiment 2 is characterized by the structure of the returning means 24.

Particularly, a returning means 24 in accordance with the embodiment 2 is constituted by an tensile elastic body 24b having suitable thickness and length and made of a rubber such as a rubber cord, a rubber band, a rubber line or the like in place of the coil spring 24a of the returning means 24 in accordance with the embodiment 1. The tensile elastic body 24b in accordance with the embodiment 2 is provided with engagement portions 24c and 24c in both ends. Tensile elastic force is applied in such a manner that one engagement portion 24c is engaged with the base end portion of the opening and closing rod 23 by the screw 42, and the other engagement portion 24c is engaged with the outer surface at the suitable position of the leading end portion of the branch rod 22 by the screw 43, thereby the base end surface of the opening and closing rod 23 being pulled to the branch rod 22 side. The other structures are the same as those of the embodiment 1.

The thrust fork in accordance with the embodiment 2 is structured as mentioned above, and is used in the same manner as the embodiment 1. Accordingly, the same operations and effects as those of the embodiment 1 can be obtained.

Figure 9A:
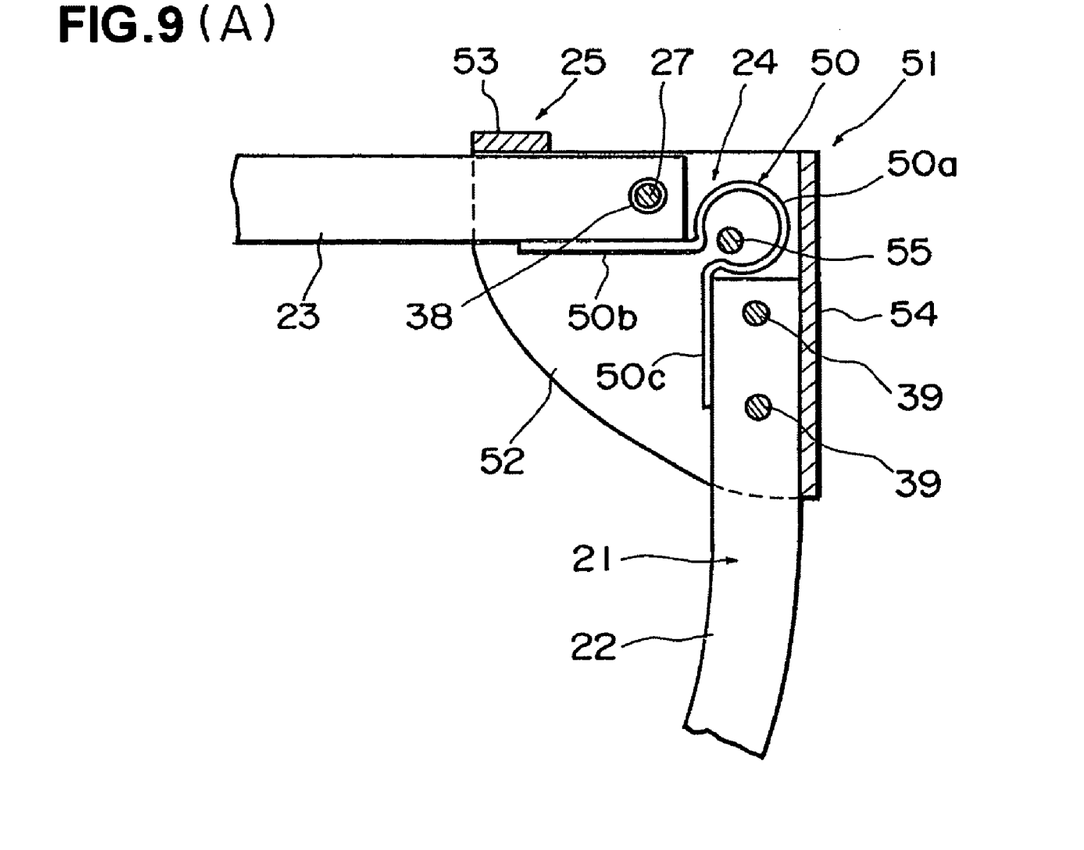
FIG. 9A is a vertical sectional view.
Figure 9B:
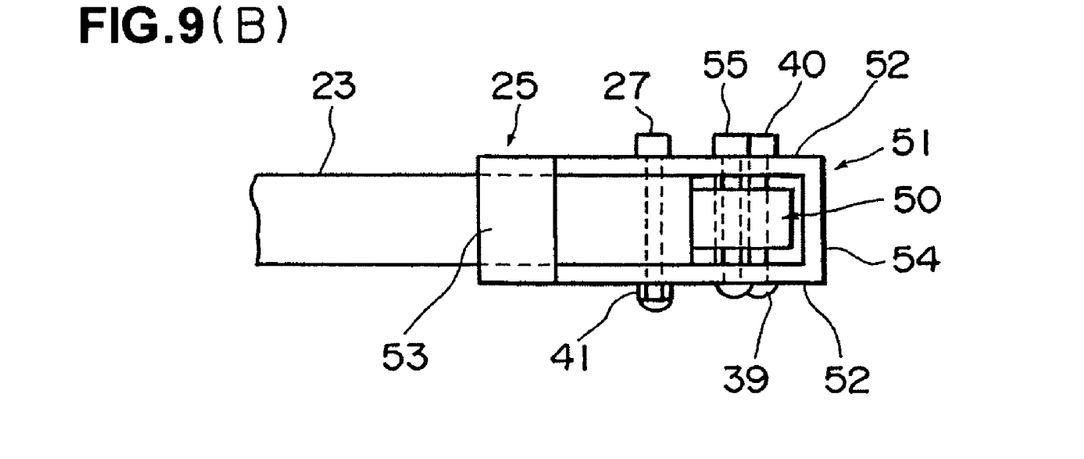
FIG. 9B is a plan view.

FIGS. 9A and 9B are a vertical cross sectional view and a plan view showing a main portion of another embodiment (an embodiment 3) of the thrust fork in accordance with the present invention. In this thrust fork, the same reference numerals are attached to the same members as the structures which are already described in the embodiment 1, and a description thereof will be omitted. The embodiment 3 is characterized by a structure in which a leaf spring 50 is employed as the returning means 24.

In the embodiment 3, there are provided attaching members 51 with function as bearings having the structure that the bearing members 28 and the attaching members 29 in the embodiment 1 are integrally formed. The attaching member 51 has a pair of attaching plates 52 and 52 having a suitable magnitude and provided so as to face to each other in parallel with a gap corresponding to a thickness of the branch rod 22, a stopper plate 53 provided by being connected to upper ends in leading end sides of both the plates 52 at right angles to them, and a connection plate 54 provided by being connected to rear ends of both the attaching plates 52 at right angles to them.

The attaching members 51 are provided by both the plates 52 being engaged with the leading end portion of the branch rod 22 in the state that the connection plates 54 are directed to the outer portion side of the forked rod 21, and fixed to both the branch rods 22 respectively by fastening with the screws 39 and the nuts 40. Further, both the opening and closing rods 23 have the axial holes 38 provided at positions in the base end portions of the rods 23. Further, both the opening and closing rods 23 are respectively attached to both the attaching plates 52 of the attaching members 51 by the base end portion sides of both the opening and closing rods 23 being inserted to the portion between both the attaching plates 52 of the attaching member 51, and fastened by the shafts 27 and the nuts member 41 through the axial holes 38 in such a manner that both the opening and closing rods 23 become rotatable. Accordingly, both the opening and closing rods 23 are structured such as to be pivoted in the base end portion by the shaft 27, be regulated in the motion of swiveling in the outward direction of the forked rod 21 by the stopper means, that is, the stopper plate 53, and freely swivel only in the inward direction of the forked rod 21 (freely rise and fall with respect to the branch rod).

The stopper means in accordance with the embodiment 3 is structured by the stopper plate 53 provided in the attaching member 51 as mentioned above.

The returning means 24 in accordance with the embodiment 3 is structured by a leaf spring 50 having suitable width and length and made of a metal. The leaf spring 50 in accordance with the embodiment 3 is obtained by forming a curved spring portion 50a curved in an approximately circular shape at an approximately center portion of the spring member, and forming a pair of spring pieces 50b and 50c having a suitable length so as to extend from the spring portion 50a.

Further, the structure is made such that the curved spring portion 50a is arranged so as to be positioned between the base end portion of the opening and closing rod 23 and the upper end surface of the branch rod 22, and pressing force is applied in such a manner that the one spring member 50b is brought into contact with an inner surface (a lower surface in FIG. 9A) of the opening and closing rod 23, and the other spring piece 50c is brought into contact with the inner surface of the branch rod 22, so as to move both the rods 22 and 23 apart from each other on the basis of the spring operation. Accordingly, both the opening and closing rods 23 are structured such as to receive the pressing force in the direction of rising with respect to the branch rods 22. In FIG. 9, reference numeral 55 denotes a bolt and nut positioned in a suitable portion within the curved spring portion 50a and provided so as to bridge between both the attaching plates 52 of the attaching member 51. The other structures are the same as those in the embodiment 1.

In accordance with the structure mentioned above, when the pressing force in the inward direction of the forked rod 21 is applied to both the opening and closing rods 23, both the rods 23 swivel in the direction of moving apart from each other against the operation of the leaf spring 50, and is returned to the original position on the basis of the operation of the spring 50 by releasing of the pressing force.

The thrust fork in accordance with the embodiment 3 is structured as mentioned above, and is used in the same manner as the embodiment 1. Accordingly, the same operations and effects as those of the embodiment 1 can be achieved.

Figure 10:
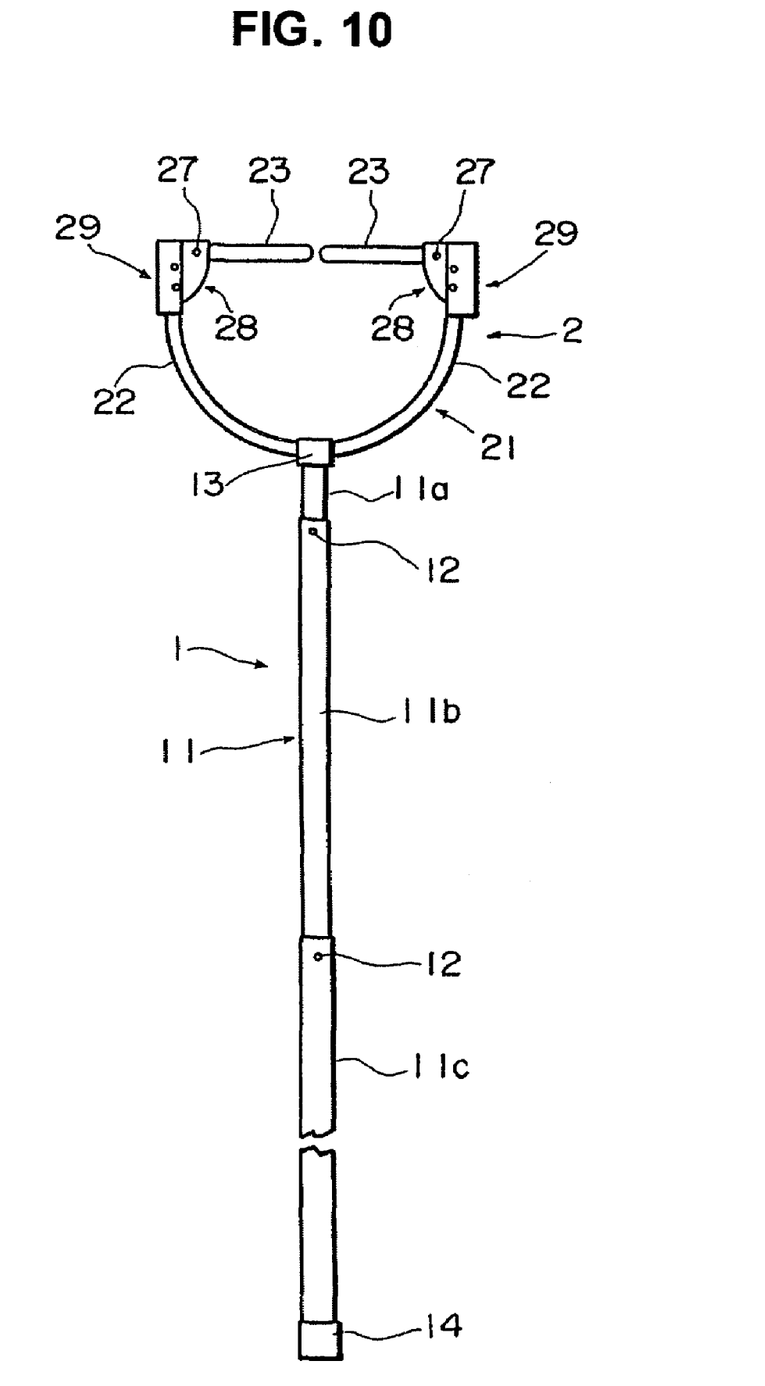
FIG. 10 is a front view showing an outline of an entire structure of another embodiment of the thrust fork in accordance with the present invention.
Figure 11A:
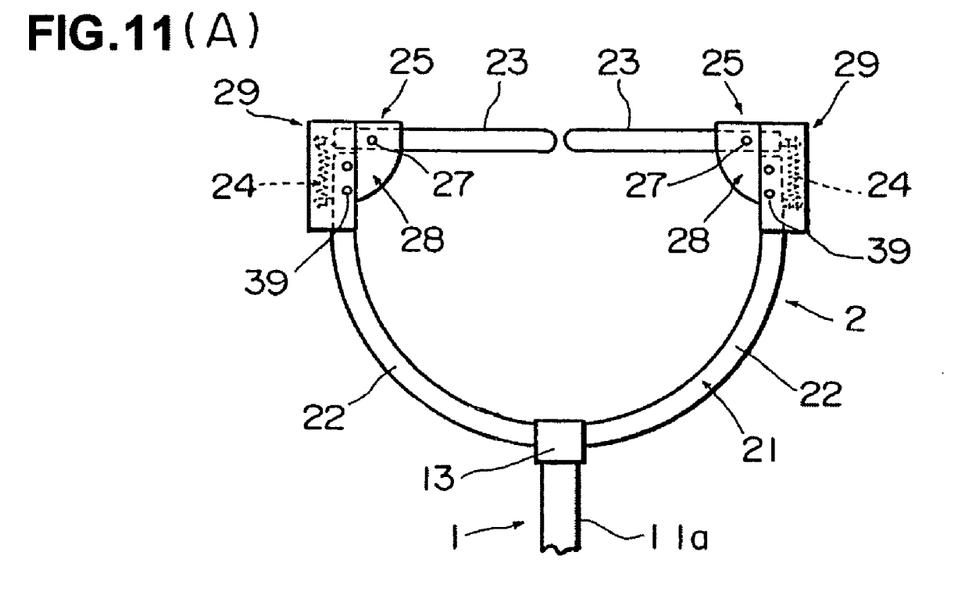
FIG. 11A is a front view showing the state that both movable opening and closing rods are closed.
Figure 11B:
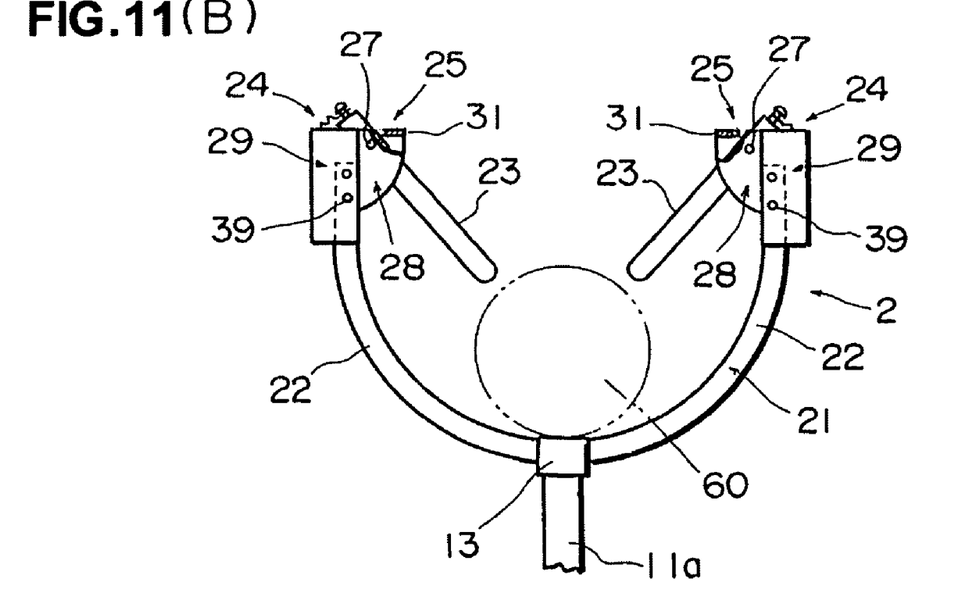
FIG. 11B is a front view showing the state that both the opening and closing rods are open.

FIG. 10 is a front view showing an outline of another embodiment (an embodiment 4) of the thrust fork in accordance with the present invention, and FIGS. 11A and 11B are views showing a portion of a thrust fork main body of the thrust fork in FIG. 10 in an enlarged manner, in which FIG. 11A is a front view showing the state that both movable opening and closing rods are closed, and FIG. 11B is a front view showing the state that both the opening and closing rods are open. In this thrust fork, the same reference numerals are attached to the same members as the structures which are already described in the embodiment 1, and a description thereof will be omitted.

The embodiment 4 is characterized by the structure that the constraining rope 26 is omitted in the thrust fork in accordance with the embodiment 1. In other words, the thrust fork in accordance with the embodiment 4 employs the structure in which the constraining rope 26 provided in the thrust fork main body 2 of the thrust fork in accordance with the embodiment 1 is detached. In FIG. 11B, reference numeral 60 denotes a target region (a leg, a thigh or the like) of the criminal or the like. The other structures are absolutely the same as the embodiment 1.

The thrust fork in accordance with the embodiment 4 is structured as mentioned above. Next, a description will be given of an example of a using method, an operation and the like. For example, in the case of pressing the leading end of the thrust fork main body 2 to the target region 60 (a thigh or the like) of the criminal or the like to hold it between both the branch rods 22 at a time of arresting the criminal or the like, both the opening and closing rods 23 swivel in the direction of moving apart from each other so as to open the leading ends of the forked rod 21 and introduce the thigh or the like 60 into the inner portion side of the forked rod 21. Further, since both the opening and closing rods are returned on the basis of the spring operation of the returning means 24 and the leading ends of the forked rod 21 are closed when the thigh or the like 60 passes through the portion between the leading ends of both the opening and closing rods, the thigh or the like 60 becomes in the state of being caught in the forked rod 21. Accordingly, since the thigh or the like of the criminal or the like is constrained and the motion thereof is regulated, it is possible to easily arrest the criminal or the like. Further, since the criminal or the like can be easily tripped sideways by operating the handle portion 1 such as pulling the handle portion 1 in the state that the thigh or the like is caught in the forked rod as mentioned above, it is possible to easily arrest the criminal person or the like.

In the embodiment 4, there is disclosed the example in which the returning means 24 is structured by the coil spring, however, the rubber made tesile elastic body 24b as in the embodiment 2, or the means constituted by the leaf spring 50 as in the embodiment 3 can be also employed for the returning means 24.

What is claimed is:

1. A thrust fork comprising:
a handle portion; and
a thrust fork main body provided in a leading end of the handle portion,
said thrust fork main body including
a forked rod having a pair of branch rods branched in a forked shape;
a pair of movable opening and closing rods which have base end portions respectively attached to leading end portions of said branch rods via pivots and are arranged so as to oppose to each other and to freely swivel around the pivots in rising and falling directions with respect to said branch rods;

returning means for biasing said opening and closing rods so as to swivel in the rising direction with respect to said branch rods;

stopper means for regulating motion of said opening and closing rods swiveling in an outward direction of said forked rod;

said stopper means permitting said opening and closing rods to be arranged between a position substantially aligned with each other when said opening and closing rods swivel in the rising direction and a position slanted down toward said forked rod when said opening and closing rods swivel in the falling direction; and a constraining rope having a desired length and provided in the manner that one end is engaged with a leading end portion of said one opening and closing rod and the other end is engaged with a leading end portion of said other opening and closing rod wherein the leading ends of said forked rod are opened and closed by said both the opening and closing rods, by swiveling of said both the opening and closing rods.

2. A thrust fork as claimed in claim 1, wherein said returning means is structured by a tensile coil spring.

3. A thrust fork as claimed in claim 2, wherein said stopper means is structured such as to include stopper plates which are fixed to leading end sides of said both the branch rods and are brought into contact with predetermined portions of said opening and closing rods when said opening and closing rods swivel to a predetermined position in the returning direction.

4. A thrust fork as claimed in claim 1, wherein said returning means is structured by a tensile elastic body made of tensile rubber or the like.

5. A thrust fork as claimed in claim 4, wherein said stopper means is structured such as to include stopper plates which are fixed to leading end sides of said both the branch rods and are brought into contact with predetermined portions of said opening and closing rods when said opening and closing rods swivel to a predetermined position in the returning direction.

6. A thrust fork as claimed in claim 1, wherein said returning means is structured by a leaf spring pressing said opening and closing rods in the direction of rising with respect to said branch rod.

7. A thrust fork as claimed in claim 6, wherein said stopper means is structured such as to include stopper plates which are fixed to leading end sides of said both the branch rods and are brought into contact with predetermined portions of said opening and closing rods when said opening and closing rods swivel to a predetermined position in the returning direction.

8. A thrust fork as claimed in claim 1, wherein said stopper means is structured such as to include stopper plates which are fixed to leading end sides of said both the branch rods and are brought into contact with predetermined portions of said opening and closing rods when said opening and closing rods swivel to a predetermined position in the returning direction.

9. A thrust fork as claimed in claim 1, wherein said handle portion is structured by a multistage type telescopic rod.

* * * * *